A. H. MOORE.
SHEET METAL NUT AND METHOD OF MAKING THE SAME.
APPLICATION FILED FEB. 7, 1913.

1,088,437.

Patented Feb. 24, 1914.

WITNESSES:
Mary E. Fuller,
M. O. Williams

INVENTOR:
Arthur H. Moore,
BY
Beach & Fisher
ATTORNEYS.

UNITED STATES PATENT OFFICE.

ARTHUR H. MOORE, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

SHEET-METAL NUT AND METHOD OF MAKING THE SAME.

1,088,437.

Specification of Letters Patent. Patented Feb. 24, 1914.

Application filed February 7, 1913. Serial No. 746,816.

*To all whom it may concern:*

Be it known that I, ARTHUR H. MOORE, a citizen of the United States, residing in Bridgeport, county of Fairfield, and State of Connecticut, have invented certain new and useful Improvements in Sheet-Metal Nuts and Methods of Making the Same, of which the following is a full, clear, and exact description.

One of the primary objects of the present invention is to provide a simple, inexpensive form of sheet metal nut particularly adapted for pipe couplings, and more especially designed for use on spuds such as commonly employed in connecting a water closet bowl with the flushing tank.

Another object of the invention is to provide an improved and simplified method by which nuts of this type may be manufactured.

To these and other ends, the invention consists in the novel features to be hereinafter described and claimed.

Figure 1:
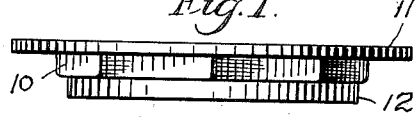
Figure 2:
Figure 3:
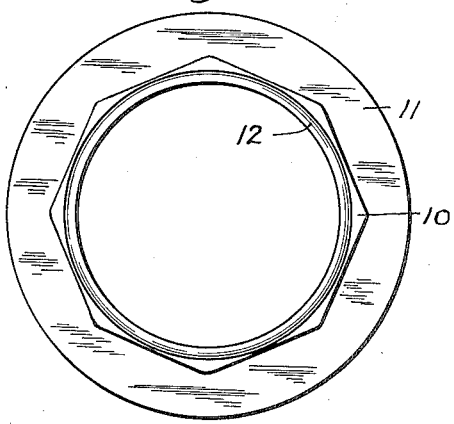
Figure 7:
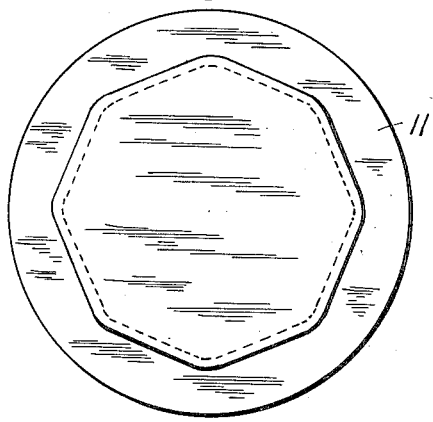
Figure 4:
Figure 5:
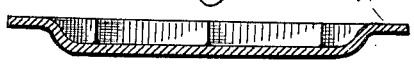
Figure 6:
Figure 8:
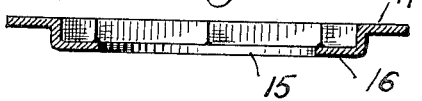

In the accompanying drawing, Figure 1 is a side elevation of a nut constructed in accordance with my invention, Fig. 2 is an axial section of the same, Fig. 3 is a bottom plan view of Fig. 1, and Figs. 4 to 9 inclusive, show different stages in the process of manufacture, Fig. 7 being a bottom plan view of Fig. 6.

Referring to the drawing, the improved nut comprises a sheet metal body portion 10 which is polygonal in outer configuration. At one end of the body 10 an integral outturned flange 11 is provided, and at the opposite end a cylindrical wall 12 extends integrally from the body 10 in a direction axially of the nut *i. e.* at right angles to the flange 11. Referring to Figs. 1 and 2, it will be noted that the wall 12 forms a downward continuation of the body 11, and that its exterior diameter is about the same as or slightly less than the minimum exterior diameter of the body 10. The inner surface of the cylindrical wall 12 is provided with interior screw threads 13.

The shape of the body 10 provides an effective grip for the wrench, and by preference the body will have at least eight sides, as shown so that the wall 12 and body 10 will merge into each other quite gradually. By having the outer surface of the wall 12 of approximately the same diameter as the minimum outside diameter of the body 10, it will be understood that only a comparatively small shoulder is formed between these parts of the nut, as shown in Fig. 2, so that a nut having a maximum axial dimension may be constructed from a blank of given size, as hereinafter set forth.

Figure 9:
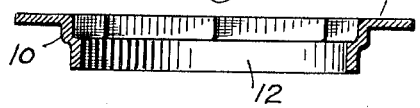

The nut as thus formed, is constructed in substantially the following manner: I take a flat, circular blank 14 of sheet metal (Fig. 4) and cup the central portion thereof in polygonal form, as shown in Fig. 5, the diameter of the cup being less than the diameter of the blank so as to provide the flange 11 on the periphery of the polygonal cup. The cup is then stamped to sharpen the polygonal form of the same and accentuate the angles thereof, as shown in Figs. 6 and 7, after which the bottom of the cup is pierced with a central circular opening or aperture 15 (Fig. 8) forming an inwardly directed flange 16 around the bottom of the cup. The flange 16 is then turned or bent downward by suitable tools to present the cylindrical wall 12, as shown in Fig. 9. The wall 12 is then provided with interior screw threads 13, and the construction of the nut is complete.

In making the nut, it is not always necessary to pierce the opening 15 after the cup has been formed, as said opening may be made prior to or during the cupping operation.

The improved nut herein described may be very easily and inexpensively manufactured. Very little stock is required and the several manufacturing operations can be readily carried out with simple tools. The nut itself, while of little bulk and weight, is sufficiently strong for the intended purposes and gives very efficient, durable service at a remarkably low cost.

I do not claim broadly a sheet metal nut consisting of a polygonal body having an integral outturned flange at one end and a cylindrical wall integral with said body at the other end and provided with screw threads; nor do I claim broadly the method of making an outwardly flanged nut which comprises cupping the central portion of a disk like blank into polygonal form, piercing the blank so that an opening will be formed in the bottom of the cup, and turning the edge of said opening in a direction axially of the blank.

What I claim is:

1. The method of making an outwardly flanged sheet metal nut, which comprises cupping in polygonal form the central portion of a disk like blank of sheet metal so as to leave a lateral outturned flange around the cup, piercing the central portion of the blank with an opening of less diameter than the cup whereby an inturned flange is created at the bottom of the cup, bending substantially the whole of said flange to present a cylindrical wall extending away from the side walls of the cup in a direction axially of the blank, and threading the interior surface of such cylindrical wall; substantially as described.

2. As an article of manufacture, a nut comprising a sheet metal polygonal body, an outturned flange integral with said body at one end, and a cylindrical wall integral with said body at the other end and extending away from said body in a direction to increase the axial dimension of the nut, the inner surface of said cylindrical wall being threaded; substantially as described.

3. As an article of manufacture, a nut comprising a sheet metal polygonal body, an outturned flange integral with said body at one end, and a cylindrical wall extending integrally from said body at the other end in a direction to increase the axial dimension of the nut, said cylindrical wall being threaded and having an exterior diameter approximating the minimum exterior diameter of said polygonal body; substantially as described.

4. As an article of manufacture, a nut comprising a hollow octagonal body of sheet metal, a flange integral with said body, and a cylindrical wall integral with said body and extending therefrom in a direction to increase the axial dimension of the nut, said cylindrical wall being interiorly threaded and having an external diameter approximately equal to the minimum exterior diameter of said octagonal body; substantially as described.

In witness whereof, I have hereunto set my hand on the 30th day of January, 1913.

ARTHUR H. MOORE.

Witnesses:
L. M. ALLEN,
HERBERT BIRDSEYE.